(12) United States Patent
Exley

(10) Patent No.: US 11,628,992 B2
(45) Date of Patent: Apr. 18, 2023

(54) AGED SPIRIT PRESERVATION SYSTEMS AND DEVICES

(71) Applicant: Jeremy Thomas Exley, Eden Prairie, MN (US)

(72) Inventor: Jeremy Thomas Exley, Eden Prairie, MN (US)

(73) Assignee: Prairie Lake Innovations, Bloomington, MN (US)

( * ) Notice: Subject to any disclaimer, the term of this patent is extended or adjusted under 35 U.S.C. 154(b) by 729 days.

(21) Appl. No.: 16/682,832

(22) Filed: Nov. 13, 2019

(65) Prior Publication Data

US 2020/0156834 A1 May 21, 2020

Related U.S. Application Data

(60) Provisional application No. 62/769,429, filed on Nov. 19, 2018.

(51) Int. Cl.
  *B65D 51/24* (2006.01)
  *B65D 39/00* (2006.01)
  (Continued)

(52) U.S. Cl.
  CPC .......... *B65D 51/244* (2013.01); *B01J 20/08* (2013.01); *B01J 20/103* (2013.01); *B01J 20/18* (2013.01); *B01J 20/20* (2013.01); *B65D 39/00* (2013.01); *B65D 39/0058* (2013.01); *B65D 39/14* (2013.01); *B65D 51/248* (2013.01);
  (Continued)

(58) Field of Classification Search
  CPC .. B65D 51/244; B65D 39/00; B65D 39/0058; B65D 39/14; B65D 51/248; B65D 55/026; B65D 2203/121; B65D 81/268; B65D 33/00; B65D 51/30; B01J 20/08; B01J 20/103; B01J 20/18; B01J 20/20; C12H 1/14
  See application file for complete search history.

(56) References Cited

U.S. PATENT DOCUMENTS 4,169,811 A  10/1979 Yoshikawa
4,188,457 A  2/1980 Throp
(Continued)

FOREIGN PATENT DOCUMENTS

WO  1996039338 A1  12/1996
WO  2016115108 A1  7/2016
WO  2018075900 A1  4/2018

*Primary Examiner* — Shawn M Braden
(74) *Attorney, Agent, or Firm* — Gallium Law; Wesley Schwie, Esq.; Isabel Fox

(57) ABSTRACT

Many embodiments described herein prevent an aged spirit from degrading due to the oxygen trapped in the headspace without the use of a pump. The aged spirit preservation system may have a cork with an open top, an open bottom, and a channel extending from the open top to the open bottom. The cork may be sized couple to an internal portion of a bottle. The system may even include a sealing device coupled to an outer portion of the cork between the open top and the open bottom. Additionally, the system may include a replaceable cartridge containing an adsorbent media, iron, a salt, and a color-changing indicator. Oxygen from the bottle may be allowed to enter the cartridge and react with the iron via a non-reversible reaction, thereby preventing the degradation of the spirit.

20 Claims, 8 Drawing Sheets

(51) Int. Cl.
*C12H 1/14* (2006.01)
*B01J 20/20* (2006.01)
*B01J 20/18* (2006.01)
*B01J 20/08* (2006.01)
*B01J 20/10* (2006.01)
*B65D 39/14* (2006.01)
*B65D 55/02* (2006.01)

(52) U.S. Cl.
CPC ............ *B65D 55/026* (2013.01); *C12H 1/14* (2013.01); *B65D 2203/12* (2013.01)

(56) References Cited

U.S. PATENT DOCUMENTS

| | | |
|---|---|---|
| 4,287,995 A | 9/1981 | Moriya |
| 4,349,509 A | 9/1982 | Yoshikawa |
| 4,421,235 A | 12/1983 | Moriya |
| 4,526,752 A | 7/1985 | Perlman |
| 4,756,436 A | 7/1988 | Morita |
| 4,830,442 A | 5/1989 | Moss |
| 4,840,280 A | 6/1989 | Schvester |
| 4,942,048 A | 7/1990 | Nasu |
| 5,096,813 A | 3/1992 | Krumhar |
| 5,143,763 A * | 9/1992 | Yamada ............... B65D 81/267 215/261 |
| 5,328,894 A | 7/1994 | Wakabayashi |
| 6,254,969 B1 | 7/2001 | Eberle |
| 6,274,210 B1 | 8/2001 | Ebner |
| 2011/0278256 A1* | 11/2011 | Suh .................... B65D 39/0023 215/355 |
| 2011/0290757 A1 | 12/2011 | Purdy |
| 2014/0312000 A1* | 10/2014 | Xu ....................... B65D 51/244 215/228 |
| 2018/0002081 A1* | 1/2018 | Lutz ..................... B65D 51/28 |
| 2019/0270560 A1* | 9/2019 | Lutz ..................... B65D 51/30 |

* cited by examiner

AGED SPIRIT PRESERVATION SYSTEMS AND DEVICES

BACKGROUND

Field

Various embodiments disclosed herein relate to aged spirits. Certain embodiments relate to preserving aged spirits.

Description of Related Art

Aged spirits, such as Scotch whisky, may be collected and consumed by people over extended periods of time. Unfortunately, when the spirit sits in the bottle for an extended period of time, the contents may become oxidized and the flavor may be affected in an undesirable way. Currently, there are various preservation systems available, but they're all designed for spirits containing a relatively low percentage of ethanol, such as wine. These systems frequently use a pump to rapidly remove the oxygen from the bottle. However, pumping air out of the bottle does not remove all of the air. Another method is to spray compressed nitrogen into the bottle before re-corking. But this method requires extra equipment that can be expensive. Bottles with spirits containing a relatively high percentage of ethanol tend to have different compounds in the headspace. Therefore, there is a need to remove oxygen from bottles with a relatively high percentage of ethanol.

SUMMARY

This disclosure includes a variety of aged spirit preservation system and device embodiments. Some embodiments may include a cork having an open top, an open bottom, and a channel extending from the open top to the open bottom. The cork may be sized and configured to slidably and sealably couple to an internal portion of a bottle. The system may further include a sealing device coupled to an outer portion of the cork between the open top and the open bottom. The sealing device may be arranged and configured to seal against the internal portion of the bottle.

In some embodiments, the cork further defines a top portion adjacent to the open top, a bottom portion adjacent to the open bottom, and middle portion located between the top portion and the bottom portion. The bottom portion and the middle portion may be sized and configured to slidably couple to the internal portion of the bottle opening. The top portion may protrude from the bottle opening. Additionally, some embodiments include a cartridge sized and configured to slidably couple into an internal surface of the channel by sliding into the open top of the cork to thereby create the seal against the internal surface of the channel. The cork may be constructed from a chemically inert material.

In some embodiments, the cartridge defines a hollow inner portion and a semi-open first end that faces the internal portion of the bottle when the cartridge is slidably coupled to the internal surface of the channel. The cartridge may include an O-ring coupled to an outer surface of the cartridge. The O-ring may be sized and configured to create a seal against the internal surface of the channel. Furthermore, the cartridge may also include a lid coupled to the semi-open first end. The lid may have a hydrophobic membrane that may be arranged and configured to prevent solids and liquids from passing through the membrane, and to allow gas and vapor to pass through the membrane into the hollow inner portion of the cartridge.

The cartridge may further include an adsorbent media, a salt, and a color-changing indicator located within the hollow inner portion of the cartridge. The cartridge may further include a side-viewing window arranged and configured to allow visibility to the hollow inner portion of the cartridge from an outer side of the cartridge. The adsorbent media may be at least one of activated carbon, ion-exchange resin, molecular sieve, alumina, zeolite, foam, and a mixture thereof. In some embodiments, the adsorbent media further include a silica gel infused with a salt arranged and configured to prevent the iron from setting. The iron may have a particle size of 0.0059 inches or greater. In some embodiments, the salt is at least one of potassium chloride and sodium chloride. The color-changing indicator may be an adsorbent including at least one of a dye, rusting iron, and an indication paper.

In some embodiments, a majority of the color-changing indicator is located at a closed second end of the cartridge that is opposite the semi-open first end. When the cartridge is coupled to the internal surface of the channel, the semi-open first end may face towards a bottom end of the bottle, the closed second end may face away from the bottom end of the bottle, and the closed second end may be seated below a top end of the bottle. Furthermore, the color-changing indicator may be arranged and configured to change color after the iron has reacted with a predetermined amount of oxygen and water located within the internal portion of the bottle, thereby indicating that the cartridge needs to be replaced.

The disclosure also includes an aged spirit preservation device including a cartridge defining a semi-open first end, a closed second end opposite the semi-open first end, and a hollow inner portion. The preservation device may also include a mixture located within the hollow inner portion, the mixture comprising an adsorbent media, iron, a salt, and a color-changing indicator. Some embodiments of the preservation device may further include an O-ring coupled to an outer surface of the cartridge. Additionally, the preservation device may also include a lid coupled to the semi-open first end. The lid may include a hydrophobic membrane arranged and configured to prevent solids and liquids from passing through the membrane, and to allow gas and vapor to pass through the membrane into the hollow inner portion of the cartridge.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1A:
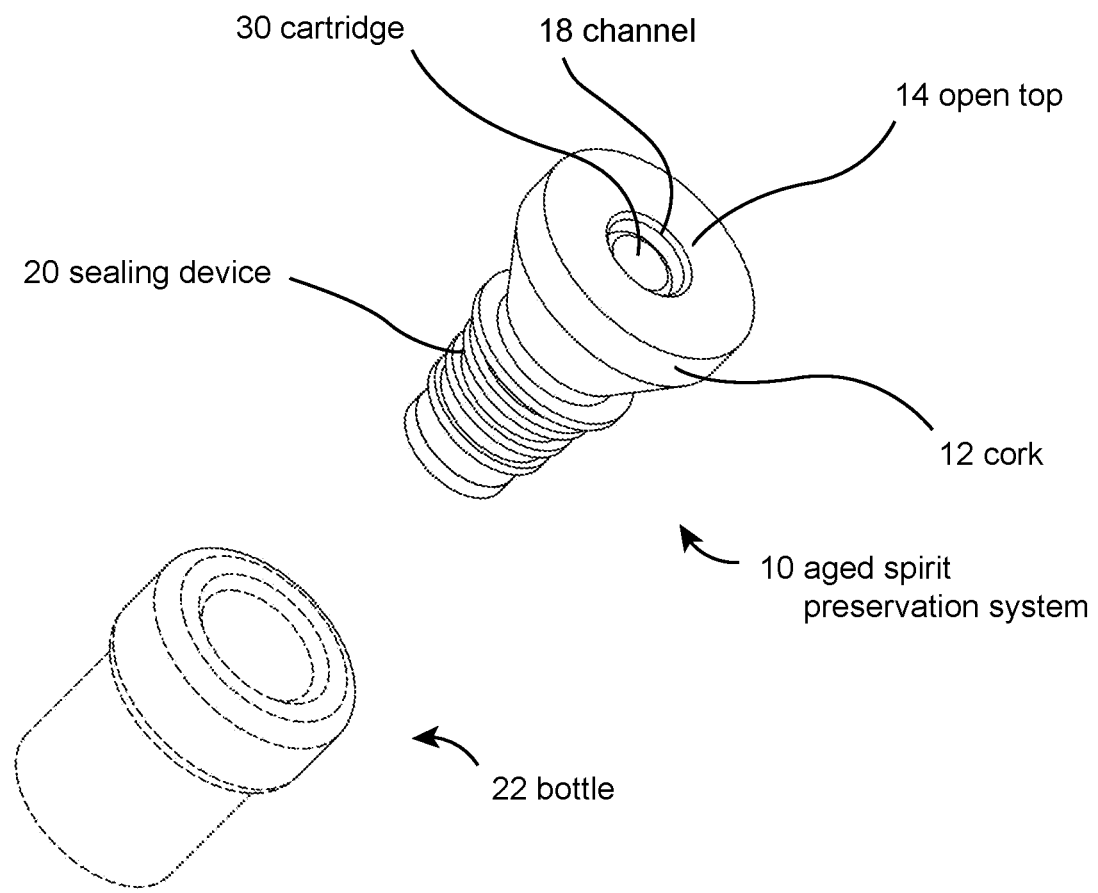
FIG. 1A illustrates a top perspective view of an aged spirit preservation system, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any system or device disclosed herein, the acts or operations of the system or device may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, methods, and/or procedures described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

INDEX OF COMPONENTS

10—Aged spirit preservation system
12—Cork
14—Open top
16—Open bottom
18—Channel
20—Sealing device
22—Bottle
24—Top portion
26—Bottom portion
28—Middle portion
30—Cartridge
32—Hollow inner portion
34—Semi-open first end
36—O-ring
38—Lid
40—Hydrophobic membrane
42—Closed second end
44—Side-viewing window

INTRODUCTION

Spirits with a high alcohol content degrade slowly when exposed to air. The alcohol itself is mostly inert. However, in a liquor containing forty percent alcohol, sixty percent is subject to degradation. This degradation occurs because of a process called oxidation. Air is comprised of approximately seventy-eight percent nitrogen and twenty-one percent oxygen. Oftentimes, water in the form of vapor is mixed in with the air and is commonly referred to as humidity. The nitrogen in air is inert, whereas oxygen is highly reactive. Interestingly, the process of producing an aged spirit involves controlled oxidation; however, extended and uncontrolled oxidation can be undesirable. When oxidation occurs uncontrolled, it can lead to unintended changes in flavor and aroma in the spirit.

Although an aged spirit is oxidized to create the desired final flavor and aroma, without controlling and limiting the extent of oxidation the aged spirit will degrade slowly from its original state. Degradation of the aged spirit through oxidation typically begins after the bottle cap is removed for the first time. When the cap is replaced, air is trapped inside the bottle. The oxygen trapped within the bottle is now free to react with the spirit. The headspace in a bottle filled with a spirit is not very large; therefore, there is not much oxygen to react. However, when the cap is repeatedly removed the oxygen is replenished and the reaction continues to occur. When a large portion of the spirit is removed from the bottle, then headspace is larger, and more oxygen is trapped within the bottle. Many embodiments herein describe how to remove the oxygen from the headspace of the bottle using a system arranged and configured to thereby prevent oxidation in the spirit and preserve the intended flavor and aroma.

System Embodiments

Figure 1B:
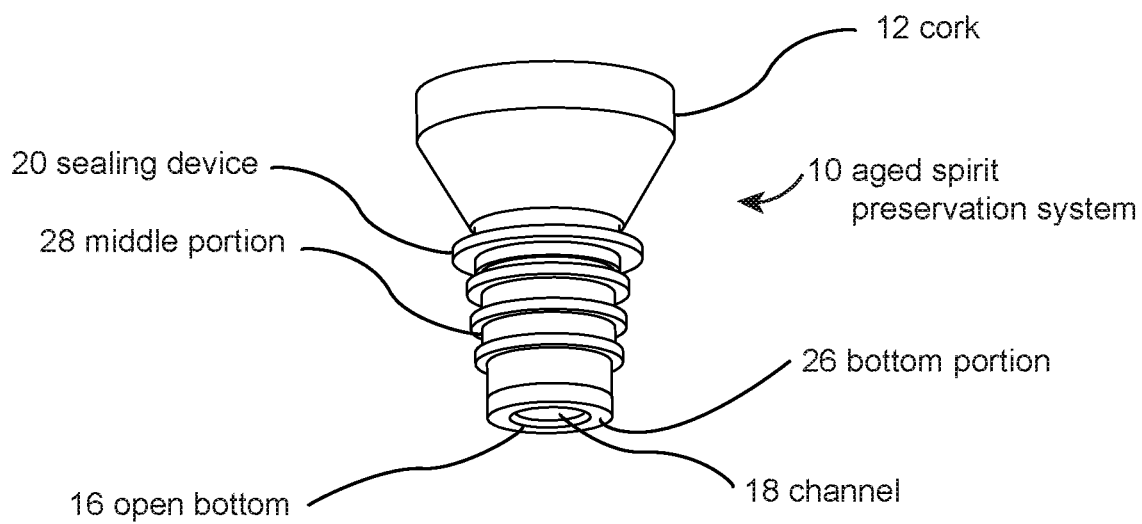
FIG. 1B illustrates a bottom perspective view of an aged spirit preservation system, according to some embodiments.
Figure 1C:
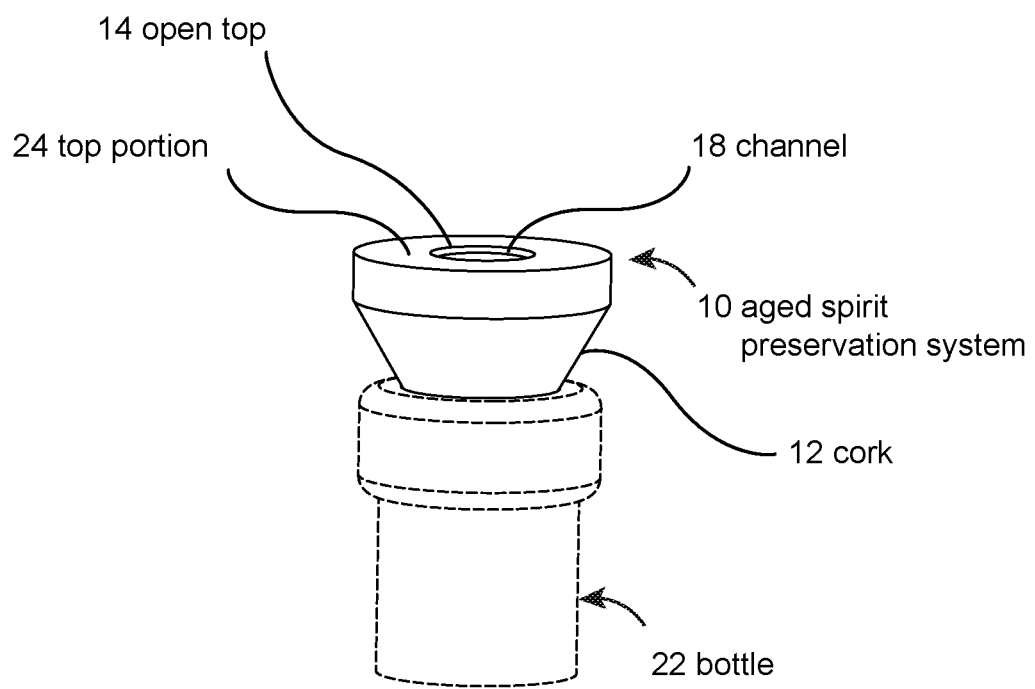
FIG. 1C illustrates a perspective view of an aged spirit preservation system slidably and sealably coupled to the internal portion of a bottle opening.

FIGS. 1A-1C illustrate an aged spirit preservation system 10. As shown, the system 10 may include a cork 12 having an open top 14, an open bottom 16, and a channel 18 extending from the open top 14 to the open bottom 16. The cork 12 may thereby be sized and configured to slidably and sealably couple to an internal portion of a bottle 22. The system 10 may also include a sealing device 20 coupled to an outer portion of the cork 12 between the open top 14 and the open bottom 16.

With continued reference to FIGS. 1A-1C, the cork 12 may define a top portion 24 adjacent to the open top 14, a bottom portion 26 adjacent to the open bottom 16, and a middle portion 28 located between the top portion 24 and the bottom portion 26. The bottom portion 26 and the middle portion 28 may be sized and configured to slidably couple to the internal portion of the bottle opening. Additionally, the top portion 24 may protrude from the bottle opening. The aged spirit preservation system 10 may further include a cartridge 30 sized and configured to slidably couple to an internal surface of the channel 18. In this manner, the cartridge 30 may slide into the open top 14 of the cork 12 to thereby create a seal against the internal surface of the channel 18 to prevent air from entering the internal portion of the bottle 22.

Figure 2:
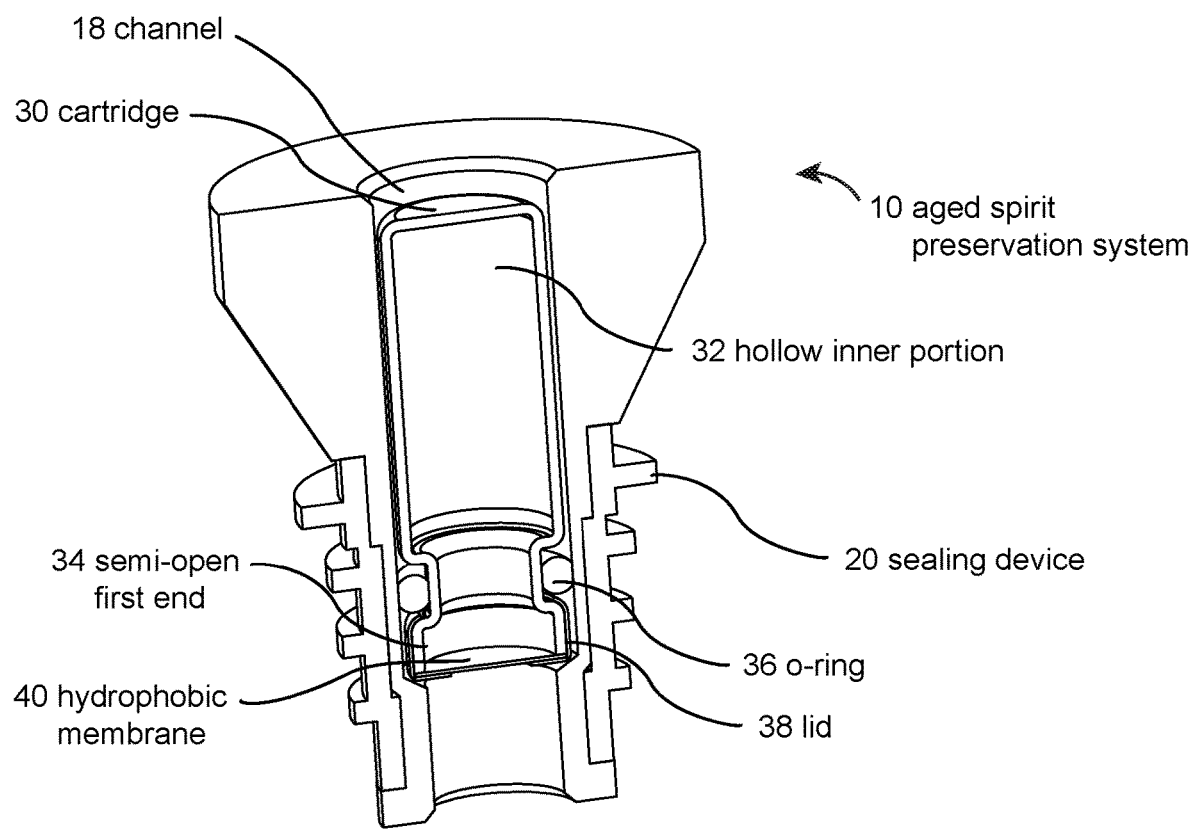
FIG. 2 illustrates a perspective view of a cross section of an aged spirit preservation system, according to some embodiments.

FIG. 2 illustrates a cross-sectional view of the aged spirit preservation system 10. As shown, the cartridge 30 is coupled within the channel 18 whereby the semi-open first end 34, the lid 38, and the hydrophobic membrane 40 face towards the aged spirit within the internal portion of the bottle 22. In order to prevent air from entering the internal portion of the bottle 22, the aged spirit preservation system 10 may include several sealing interfaces. For example, as shown in FIG. 2, the system may include a sealing device 20 that contacts and presses against an internal portion of the bottle 22 to thereby prevent air from entering the bottle 22, via the outer portion of the cartridge 30. Additionally, the system 10 may include an O-ring 36 coupled to an outer perimeter of the cartridge 30 to thereby prevent air from entering the internal portion of the bottle 22 through the channel 18, specifically within the space between the cartridge 30 and the cork 12.

Figure 3A:
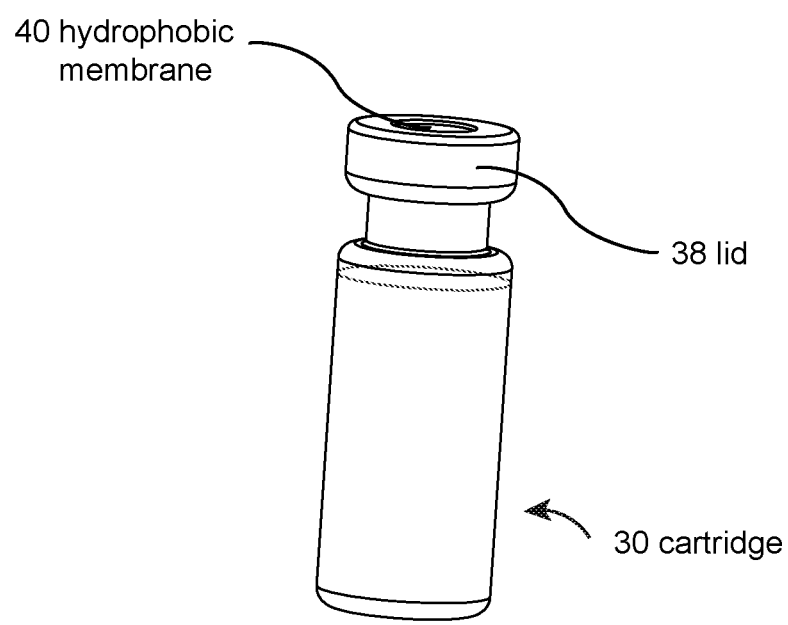
FIG. 3A illustrates a top perspective view of a cartridge, according to some embodiments.
Figure 3B:
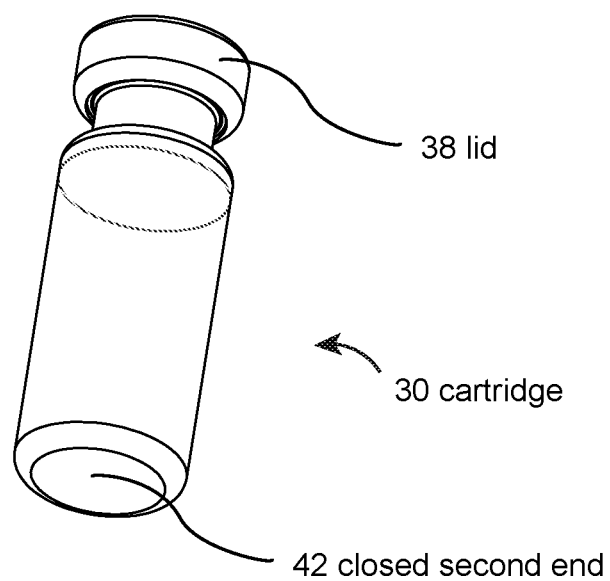
FIG. 3B illustrates a bottom perspective view of a cartridge according to some embodiments.

FIGS. 3A and 3B show different perspective views of an embodiment of a cartridge 30 that may be inserted into the channel 18. The cartridge 30 may include a hollow inner portion 32 and a semi-open first end 34. In some embodiments, the cartridge 30 may also include a lid 38 that may be constructed of a chemically inert material to prevent any oxidation or other reaction to take place. The lid 38 may also be fastened on to the cartridge 30 in many ways. For example, the lid 38 may be made of a malleable material such that the lid 38 can be crimped to the semi-open first end 34. In other embodiments, the lid 38 may screw on to the semi-open first end 34. The lid 38 may serve multiple purposes. One purpose may be to prevent unwanted material from either entering the cartridge 30, or the bottle 22. Another purpose may be to allow specific materials to be transferred from the bottle 22 to the cartridge 30 and vice versa. In some embodiments, this is accomplished by the lid 38 having a hydrophobic membrane 40 that may be designed to allow gas and vapor to pass through it, but not solids, liquids, or aqueous solutions. In other embodiments, the hydrophobic membrane 40 may be a hydrophobic rubber or a hydrophobic coating applied to a paper media or a foam.

To prevent oxidation from occurring, the cartridge 30 may further include iron. The iron may take on many forms. Some of the forms include particles, flakes, or as a coating on a carrier particle. In some embodiments, the iron particles may have a mesh size of 100 (0.0059 inches) or larger. When oxygen is incorporated into the iron it expands. If the iron sets, or clumps together, the iron particles become immobile and can put excess pressure on the cartridge 30 walls. Iron particles of this size may reduce the chance of iron setting and expanding, and thereby reduce the risk of the cartridge 30 breaking. The iron may react with the oxygen and water vapor in the air trapped in the headspace of the bottle 22 via a non-reversible reaction which will hereafter be referred to as the rusting reaction. Elemental iron ionizes to form the cation iron (II) and two electrons.

$$Fe \rightarrow Fe^{2+} + 2e^- \quad [1]$$

In the presence of the two electrons, the mixture of oxygen and water vapor form into hydroxide anions.

$$\tfrac{1}{2}O_2 + H_2O + 2e^- \rightarrow 2OH^- \quad [2]$$

The iron (II) cations and the hydride anions from equations [1] and [2] respectively bond together to form iron (II) hydroxide.

$$Fe^{2+} + 2OH^- \rightarrow Fe(OH)_2 \quad [3]$$

From there, the iron (II) hydroxide further reacts with excess oxygen and water vapor in a similar method as equations [1]-[3] to form iron (III) oxide-hydroxide.

$$Fe(OH)_2 + \tfrac{1}{4}O_2 + \tfrac{1}{2}H_2O \rightarrow Fe(OH)_3 \quad [4]$$

Equations [1]-[4] can be reduced to show the overall reaction as follows.

$$4Fe + 6H_2O + 3O_2 \rightarrow 4Fe(OH)_3 \quad [5]$$

The iron (III) oxide-hydroxide dehydrates to form iron (III) oxide hexahydrate.

$$4Fe(OH)_3 \rightarrow 2Fe_2O_3 \cdot 6H_2O \quad [6]$$

Some salts are known to accelerate the rusting reaction. Appropriate salts may include sodium chloride, potassium chloride, sodium bromide, and potassium bromide. The relative humidity in the bottle 22 is typically greater than seventy percent but can be as low as approximately fifty percent. Many salts may deliquesce due to the high relative humidity and become liquid. These liquids then become mobile and can inhibit the rusting reaction, and potentially block gas and vapor from passing through the hydrophobic membrane 40. Moreover, this can lead to the iron setting and the cartridge 30 may crack due to expansion from the rusting reaction. Salts that are known to deliquesce in the presence of high relative humidity in a spirit bottle 22 are lithium bromide, calcium bromide, sodium iodide, calcium chloride, sodium metabisulfate, and magnesium sulfate.

The salts may be added to the cartridge 30 individually or as mixture. In some embodiments, the salt may be mixed together with the iron particles. In other embodiments, the salt may be added to an adsorbent such as silica gel or activated carbon. The salt may be washed on to such adsorbents such that the salt rests in the pores on the surface of the adsorbent. The adsorbent may serve multiple purposes. One purpose for the silica gel is to carry the salt so that the salt does not come into direct contact with the iron. If the salt comes in direct contact with the iron, the iron may begin to set and expand and become mobile in a high humidity environment. The salt may come in contact with the iron itself, or the salt may be separated by one or more layers of material such as an adsorbent. Separating the layer of salt from the iron may help prevent the iron from setting and expanding. In some embodiments, the layer of salt may be sandwiched by one or more layers of other material such as an adsorbent. In other embodiments, the layers of material inside the cartridge 30 may be mixtures of any of the materials mentioned herein. For example, the cartridge 30 may have a layer of adsorbent containing salt and iron closest to the closed second end 42 of the cartridge 30, then a layer of pure adsorbent closest to the semi-open first end 34 of the cartridge 30.

Another purpose of the adsorbent may be to control the humidity of the air passing through the hydrophobic membrane 40. To control the humidity, the adsorbent retains the moisture to help provide a constant mode of transport for the ions, thus promoting the rusting reaction. Other methods of controlling the humidity may also be used, such as using molecular sieves, clays, ion-exchange resins, or superabsorbent. In other embodiments, the salt may be added to the cartridge 30 as a layer.

Moreover, the adsorbent material may serve another purpose. While the rusting reaction is non-reversible, the humidified air may react with some of the spirit before it crosses the hydrophobic membrane 40 in the lid 38. When this happens, undesirable byproducts can be made as a result of the oxidation process. These byproducts may alter the flavor and/or aroma of the spirit. The byproducts may pass through the hydrophobic membrane 40 and cling to the adsorbent media such that the byproducts will not affect the flavor and/or aroma of the spirit. Several adsorbent materials are appropriate to use, including but not limited to activated carbon, ion exchange resins, molecular sieves, alumina, foam, zeolites, and a mixture thereof.

The cartridge 30 may further include an indicator to thereby provide a visual conformation that the rusting reaction has taken place. The indicator may take on many embodiments. For example, the indicator may provide visual confirmation by changing color. The indicator may be oxygen sensitive such that the color changes in the presence of oxygen. In one such embodiment, the indicator may be the iron itself. As the iron particles begin to react with the oxygen and water vapor, the iron will change from a dark grey or black color to a red-brown color. The indicator may also be a dye such as methylene blue, which is pink in the absence of oxygen and changes to purple or blue in the presence of oxygen. The dye may be added to the cartridge 30 alone or coated onto an adsorbent. The adsorbent material with dye may be mixed in with the iron particles. Adding the indicator in this way shows the progression of how much iron has been converted to iron (III) oxide. In some embodiments, the adsorbent material with dye may be concentrated at the closed second end 42 of the cartridge 30. In this way, the indicator will change color only when most of the iron has reacted. In some embodiments, a strip of paper may be coated in the oxygen sensitive indicator. In some embodiments with a paper indicator, the indicator may be a strip of paper starting at the semi-open first end 34 and ending at the closed second end 42 of the cartridge 30. The paper indicator may change color progressively as the rusting reaction travels to the closed end of the cartridge 30. Similarly, in some embodiments, the paper indicator may line the inner portion of the cartridge 30. In other embodiments, a polymeric film may be used as the indicator. The polymeric film indicator may be used as a strip or line the inner portion of the cartridge 30.

Figure 4:
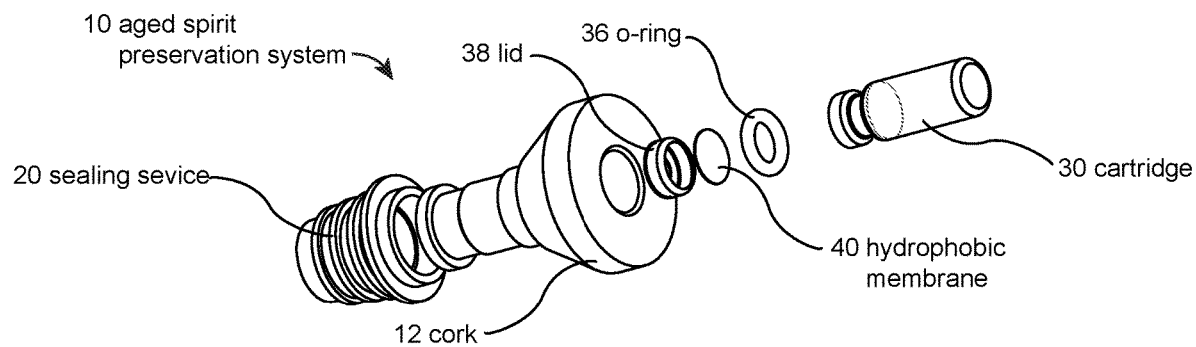
FIG. 4 illustrates an exploded view of an aged spirit preservation system, according to some embodiments.

FIG. 4 shows an exploded view of an embodiment of a spirit preservation system 10. In particular, it shows a system 10 including a cork 12 with a sealing device 20, and a cartridge 30 with a lid 38, hydrophobic membrane 40, and an O-ring 36. The inner portion of the cartridge 30 in FIG. 4 has an adsorbent layer, an iron particle layer, and a concentrated indicator layer.

Figure 5:
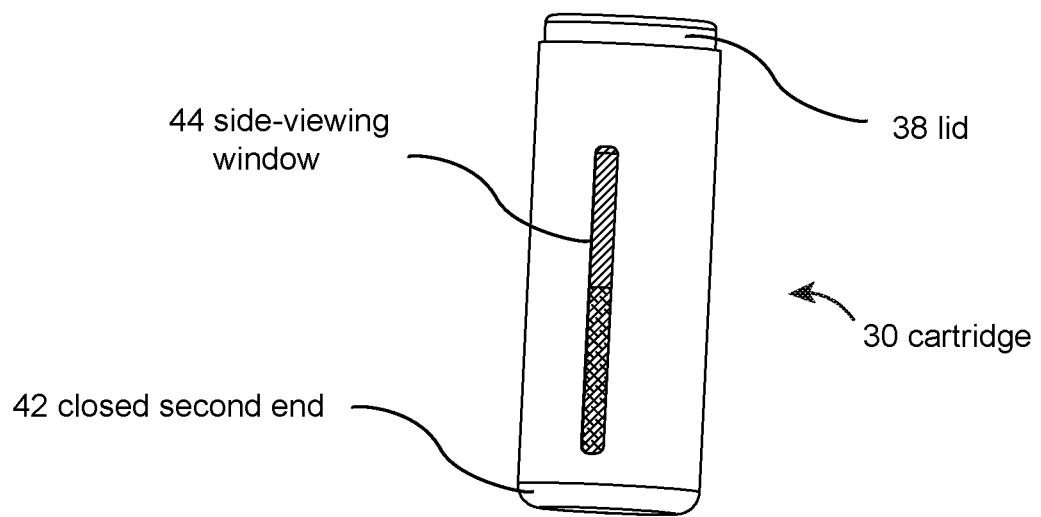
FIG. 5 illustrates a front view of a cartridge having a viewing window, according to some embodiments.

In some embodiments, the indicator may be visible from the closed second end 42 of the cartridge 30. In this way, when the cartridge 30 is in the cork 12 it can be easily seen from the open top 14. In other embodiments, the indicator may be visible from the side of the cartridge 30. FIG. 5 illustrates an embodiment in which the indicator is only visible through a side-viewing window 44 in outer portion of the cartridge 30.

In some cases, the bottle 22 may become empty before all the iron particles have been converted into iron (III) oxide. When this happens, the entire system 10, or just the cartridge 30 may be reused on a new bottle 22. In other cases, the iron particles in the cartridge 30 may all have converted before the bottle 22 is empty. For this reason, in some embodiments, the cartridge 30 may be disposable and/or replaceable. The indicator shows when the cartridge 30 is spent and needs to be replaced. Replacing the cartridge 30 ensures that the spirit will not oxidize due to the air trapped in the bottle 22.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. An aged spirit preservation system, comprising:
a cork having an open top, an open bottom, and a channel extending from the open top to the open bottom, wherein the cork is sized and configured to slidably and sealably couple to an internal portion of a bottle, wherein the cork defines a top portion adjacent to the open top, a bottom portion adjacent to the open bottom, and a middle portion located between the top portion and the bottom portion, and wherein the bottom portion and the middle portion are sized and configured to slidably couple to the internal portion of the bottle and the top portion protrudes from an opening of the bottle;
a sealing device coupled to an outer portion of the cork between the open top and the open bottom, wherein the sealing device is arranged and configured to seal against the internal portion of the bottle; and
a cartridge sized and configured to slidably couple to an internal surface of the channel by sliding into the open top of the cork to thereby create a seal against the internal surface of the channel, wherein the cartridge defines a hollow inner portion and a semi-open first end that faces the internal portion of the bottle when the cartridge is slidably coupled to the internal surface of the channel, the cartridge further comprising:
an O-ring coupled to an outer surface of the cartridge, wherein the O-ring is sized and configured to create the seal against the internal surface of the channel;
a lid coupled to the semi-open first end, wherein the lid comprises a hydrophobic membrane arranged and configured: to prevent solids and liquids from passing through the hydrophobic membrane; and to allow gas and vapor to pass through the hydrophobic membrane into the hollow inner portion of the cartridge; and
an adsorbent media, iron, a salt, and a color-changing indicator located within the hollow inner portion of the cartridge, wherein the color-changing indicator is an adsorbent comprising at least one of a dye, rusting iron, and an indication paper.

2. The preservation system of claim 1, wherein the cork is constructed from a chemically inert material.

3. The preservation system of claim 1, wherein the adsorbent media is at least one of activated carbon, ion-exchange resin, molecular sieve, alumina, zeolite, foam, and a mixture thereof.

4. The preservation system of claim 3, wherein the adsorbent media further includes a silica gel infused with a salt arranged and configured to prevent the iron from setting.

5. The preservation system of claim 1, wherein the iron has a particle size of 0.0059 inches or greater.

6. The preservation system of claim 1, wherein the salt is at least one of potassium chloride and sodium chloride.

7. The preservation system of claim 1, wherein a majority of the color-changing indicator is located at a closed second end of the cartridge that is opposite the semi-open first end, and wherein when the cartridge is coupled to the internal surface of the channel the semi-open first end faces towards a bottom end of the bottle, the closed second end faces away from the bottom end of the bottle, and the closed second end is seated below a top end of the bottle.

8. The preservation system of claim 7, wherein the color-changing indicator is arranged and configured to change color after the iron has reacted with a predetermined amount of oxygen and water located within the internal portion of the bottle, thereby indicating that the cartridge needs to be replaced.

9. The preservation system of claim 8, wherein the cartridge further comprises a side-viewing window arranged and configured to allow visibility to the hollow inner portion of the cartridge from an outer side of the cartridge.

10. An aged spirit preservation device, comprising:
a cartridge defining a semi-open first end, a closed second end opposite the semi-open first end, and a hollow inner portion;
a mixture located within the hollow inner portion, the mixture comprising an adsorbent media, iron, a salt, and a color-changing indicator;
an O-ring coupled to an outer surface of the cartridge; and
a lid coupled to the semi-open first end, wherein the lid comprises a hydrophobic membrane arranged and configured: to prevent solids and liquids from passing through the hydrophobic membrane; and to allow gas and vapor to pass through the hydrophobic membrane into the hollow inner portion of the cartridge.

11. The preservation device of claim 10, wherein the adsorbent media comprises: a silica gel configured to prevent the iron from setting, and at least one of activated carbon, ion-exchange resin, molecular sieve, alumina, zeolite, foam, and a mixture thereof.

12. The preservation device of claim 10, wherein the iron has a particle size of 0.0059 inches or greater.

13. The preservation device of claim 10, wherein the salt is at least one of potassium chloride and sodium chloride.

14. The preservation device of claim 10, wherein the color-changing indicator is an adsorbent comprising at least one of a dye, rusting iron, and an indication paper.

15. The preservation device of claim 14, wherein a majority of the color-changing indicator is located at the closed second end.

16. The preservation device of claim 15, wherein the color-changing indicator is configured to change color after the iron has reacted with a predetermined amount of oxygen and water located within an internal portion of a bottle, thereby indicating that the cartridge needs to be replaced.

17. The preservation system of claim 1, wherein the hydrophobic membrane comprises a hydrophobic rubber.

18. The preservation system of claim 1, wherein the hydrophobic membrane comprises a hydrophobic coating applied to a paper media.

19. The preservation device of claim 16, wherein the color-changing indicator comprises a strip of paper.

20. The preservation device of claim 16, wherein the color-changing indicator comprises a polymeric film.

* * * * *